United States Patent Office 2,830,058
Patented Apr. 8, 1958

2,830,058

PROCESS FOR PREPARING BENZOTHIAZOLYL DISULFIDE

Donn E. Young, Middlesex, N. J., assignor to American Cyanamid Company, New York, N. Y., a corporation of Maine No Drawing. Application January 10, 1957
Serial No. 633,385

5 Claims. (Cl. 260—306.5)

This invention relates to benzothiazolyl disulfide and, more particularly, to an improvement in the preparation thereof.

Benzothiazolyl disulfide is a well known delayed action vulcanization accelerator. Its usual method of preparation involves the reaction of aniline, carbon bisulfide and sulfur to form a mercaptobenzothiazole melt, as described in U. S. Patent No. 1,631,871 to Kelly This melt is digested, usually with caustic soda, to form an aqueous solution of an alkali metal salt of mercaptobenzothiazole. The solution is then subjected to oxidation with chlorine to precipitate benzothiazolyl disulfide which is separated by filtration or the like.

In the oxidation treatment of the aqueous mercaptobenzothiazole salt solution, impurities formed during the autoclave reaction of aniline, carbon bisulfide and sulfur and put into solution during the caustic digestion of the mercaptobenzothiazole melt, precipitate as soft tarry droplets. These droplets tend to occlude particles of benzothiazolyl disulfide, the result being the formation of solid, granular sand-like agglomerates known in the art as "sand." This sand is of varied particle size, larger than the benzothiazolyl disulfide particles, ranging to as large as marbles and in many instances larger. Because it interferes with the milling and screening of the benzothiazolyl disulfide product to a suitably fine particle size, and because it causes a non-uniform dispersion of benzothiazolyl disulfide when compounded into rubber stock as a vulcanization accelerator, it is necessary to separate the sand from the benzothiazolyl disulfide.

Having separated the sand, however, it then becomes a matter of economics to endeavor to recover the occluded benzothiazole disulfide. The usual practice is to recycle the sand to the caustic digestion step where it is digested along with fresh mercaptobenzothiazole melt. Not only does separation and reworking involve an additional step and added expense but only about 80% of the benzothiazolyl disulfide content is recovered, the remainder going to undesirable by-products during digestion. The formation of sand, therefore, not only involves a problem if not separated from the benzothiazolyl disulfide, but in eliminating the problem by separating the sand, new problems are created in the attempted recovery of the benzothiazolyl disulfide content thereof.

It is a principal object of this invention, therefore, to improve on the known process of preparing benzothiazolyl disulfide by conducting the oxidation of an aqueous solution of an alkali metal salt of mercaptobenzothiazole in such a way as to minimize the formation of sand. It is a further object of this invention to minimize this formation of sand to such an extent as to eliminate its interference with the use of benzothiazolyl disulfide as a vulcanization accelerator and to avoid the necessity for separating and reworking sand to recover the benzothiazolyl disulfide content thereof.

In accordance with this invention, these objects have been met in a surprisingly simple yet unusually effective manner. In general, the invention comprises the use of a sand inhibitor. More specifically, it comprises oxidizing an aqueous solution of an alkali metal salt of mercaptobenzothiazole in the presence of a soap or a surface active agent. By so conducting the oxidation, a benzothiazolyl disulfide product of uniform particle size is obtained containing no sand-like agglomerates. The heretofore practiced steps of screening to separate the sand and the reworking thereof are accordingly eliminated. After oxidation, therefore, the benzothiazolyl disulfide precipitate is merely separated from the mother liquor.

The process of this invention is not intended to nor does it appear to produce a benzothiazolyl disulfide product of improved purity. The only object of this invention is to eliminate the formation of sand which normally occurs in chlorinating an aqueous solution of an alkali metal salt of mercaptobenzothiazole, since the impurities contained in the sand do not in themselves adversely affect the accelerating characteristic of benzothiazolyl disulfide. The use of an inhibitor in accordance with this invention effectively minimizes sand formation so that a minimum of oversize is obtained when the product is passed over a screen which normally rejects considerable sand when a product produced in the absence of an inhibitor is screened. That sand formation is avoided in this manner is quite unusual since the inhibitor appears in no way to otherwise influence the oxidation.

By soap, in accordance with this invention, is meant an alkali metal salt of a long chain aliphatic acid such as stearic, oleic, palmitic, myristic, lauric and the like. It may be added as such but is preferably added in the form of an alkaline solution. Equally effective as soaps are anionic surface active agents such as alkyl sulfonates, for example, sodium lauryl sulfonate; alkyl aryl sulfonates in which the alkyl group contains from about 8–18 carbon atoms, for example, sodium dodecyl toluene, benzene or naphthalene sulfonate; dialkyl aryl sulfonates, for example, sodium diamyl naphthalene sulfonates; and the like. Many of these surfactants are commercially available under various trade names. What makes the present invention all the more unusual is that the inhibiting action appears to be restricted to anionic surface active agents. Nonionic and cationic agents appear to be substantially inactive. While any of the above inhibitors are effective, a preferred inhibitor is an alkali metal salt of stearic acid, which acid also influences dispersion of the benzothiazolyl disulfide when compounded into rubber, this latter being a well known function of stearic acid.

The amount of inhibitor employed will vary with the purity of the particular mercaptobenzothiazole solution being treated. When the mercaptobenzothiazole has been subjected to some type of purification treatment and/or where the caustic digestion has been conducted so as to minimize dissolution of impurities, the amount of inhibitor required will naturally be less than when these steps have not been practiced. Where the impurity content is low, as little as 1% of inhibitor on the weight of the mercaptobenzothiazole has been found adequate. Usually, the amount required will be greater but generally not more than about 15% will be required. An amount of about 5–10% is, in most cases, adequate to eliminate sand formation.

The following examples will further illustrate the invention. All parts are by weight unless otherwise noted. Example 1 demonstrates an oxidation of an aqueous solution of an alkali metal salt of mercaptobenzothiazole without the use of an inhibitor.

Example 1

To 2500 parts of a sodium mercaptobenzothiazole solution containing 125 parts of real mercaptobenzothiazole is added 18.5 parts of soda ash. The solution is then heated to 55° C. and agitated while chlorine gas is introduced. Simultaneous with the formation of a white precipitate of benzothiazolyl disulfide, tarry droplets of impurities with occluded benzothiazolyl disulfide form and precipitate as heavy sand-like particles swirling at the bottom of the reaction vessel during the balance of chlorine addition. Chlorination is continued until the pH drops below pH 7.0. The resulting slurry is then passed over a 35-mesh screen and 10.5 parts of sand obtained.

Example 2

The procedure of Example 1 is repeated except that 7.0 parts of stearic acid in 200 parts of water containing sufficient caustic soda to dissolve the acid are added to the mercaptobenzothiazole solution before chlorination. During chlorination, there is no formation of sand-like agglomerates. No sand is obtained when the oxidized slurry is passed over a 35-mesh screen.

Example 3

To 2500 parts of a sodium mercaptobenzothiazole solution containing 112.5 parts of real mercaptobenzothiazole is added 21 parts of sodium carbonate and 61.5 parts of a 10% sodium stearate solution. The solution is agitated vigorously, heated to 50° C. and chlorine gas introduced until the pH of the slurry has dropped below 7.0. There is no evidence of sand-like agglomerates present, and when the slurry is passed over a 100-mesh screen, there is no oversize.

Example 4

The procedure of Example 3 is repeated except that 30.8 parts of a 10% aqueous solution of sodium oleate is used. After chlorination, the oxidized slurry is passed over a 35-mesh screen and only 0.5 part of sand is obtained.

Example 5

The procedure of Example 4 is repeated except that 61.5 parts of a 10% solution of sodium oleate is employed. After chlorination, no sand is obtained when the slurry is passed over a 100-mesh screen.

Example 6

The procedure of Example 3 is repeated using 61.5 grams of a 10% solution of sodium palmitate. No sand is obtained when passing the oxidized slurry over a 100-mesh screen.

Example 7

The procedure of Example 3 is repeated replacing the 10% sodium stearate solution with 5% by weight of lauryl sodium sulfonate based on the real mercaptobenzothiazole content. No sand is obtained when passing the oxidized slurry over a 100-mesh screen.

Example 8

The procedure of Example 7 is repeated using 5% by weight of a sodium alkyl aryl sulfonate. Again, no sand is obtained when passing the oxidized slurry over a 100-mesh screen.

I claim:

1. In a process for preparing benzothiazolyl disulfide in which mercaptobenzothiazole, prepared by reacting aniline, carbon bisulfide and sulfur, is digested to form an aqueous solution of an alkali metal salt of mercaptobenzothiazole and said solution is subjected to chlorine oxidation to precipitate benzothiazolyl disulfide, the improvement in combination therewith for minimizing the formation of sand-like agglomerates which comprises: conducting said oxidation in the presence of a member selected from the group consisting of alkali metal salts of long chain aliphatic acids and anionic surface active agents.

2. A process according to claim 1 in which the amount of member is not more than about 15% by weight of the real mercaptobenzothiazole content of the solution.

3. A process according to claim 1 in which the member is a soap.

4. A process according to claim 3 in which the member is sodium stearate.

5. A process according to claim 1 in which the member is an anionic surface active agent.

References Cited in the file of this patent

UNITED STATES PATENTS

| | | |
|---|---|---|
| 2,179,987 | Van Duzee et al. | Nov. 14, 1939 |
| 2,265,347 | Carr | Dec. 9, 1941 |
| 2,349,599 | Moorhouse | May 23, 1944 |